Jan. 4, 1966    A. I. FREDERICK    3,227,349
FLUX FEEDING AND BACK-UP APPARATUS
Filed Sept. 23, 1963    4 Sheets-Sheet 2

INVENTOR
ARTHUR I. FREDERICK
BY Cohn and Powell
ATTORNEYS

Jan. 4, 1966     A. I. FREDERICK     3,227,349
FLUX FEEDING AND BACK-UP APPARATUS
Filed Sept. 23, 1963     4 Sheets-Sheet 3

INVENTOR
ARTHUR I. FREDERICK
BY Cohn and Powell
ATTORNEYS

INVENTOR
ARTHUR I. FREDERICK
BY Cohn and Powell
ATTORNEYS

United States Patent Office 3,227,349
Patented Jan. 4, 1966

3,227,349
FLUX FEEDING AND BACK-UP APPARATUS
Arthur I. Frederick, Webster Groves, Mo., assignor to The Pandjiris Weldment Co., St. Louis, Mo., a corporation of Missouri
Filed Sept. 23, 1963, Ser. No. 310,789
20 Claims. (Cl. 228—41)

This invention relates generally to improvements in a flux feeding and back-up apparatus, and more particularly to improvement that adapt the unit for any contour or shape of tank as the tank rotates during welding operation.

It is well known to place a tank on turning rolls and rotate it while a circumferential seam is welded. At times, it is advantageous and desirable to make the weld from the inside of the tank, and in such event, flux is fed below the welding zone to provide a back-up.

An important object is to provide a device that feeds flux continuously to a welding zone while welding a circumferential seam in a tank upon rotation of the tank, and which maintains a flux back-up for the welding electrode. The flux is fed from a remote point directly to the welding zone.

Another important objective is achieved by a mechanism that supports and feeds the flux to provide a back-up continuously regardless of the tank contour or section, whether it by cylindrical, oval, flat, or irregular. No matter what the shape, the flux belt will be held tightly against the tank under the welding zone so that the flux will provide an effective back-up.

Still another important object is realized by a flux back-up device in which a first cradle is pivotally mounted on a frame on an axis, and a second cradle is pivotally mounted to the first cradle on an axis angularly related to the axis of the first cradle. Rolls are rotatively mounted to the second cradle, and a belt is disposed over the rolls so that flux is delivered under a welding zone to provide a flux back-up. The structural arrangement affords this advantageous result for any tank circumferential contour.

An important object is obtained by arranging the pivot axis of the first cradle substantially at a right angle to the pivot axis of the second cradle relative to the first cradle, and by arranging the rotative axes of the rolls substantially parallel to each other and to the pivot axis of one of the cradles in order to have the belt conform to any surface contour.

Another important object is provided by pivotally mounting the main frame to a base, and by having means for raising the frame to urge the rolls and hence the belt against a rotating workpiece in order for the endless belt to bring the flux in to the work area.

Yet another important object is achieved by the provision of means carried by one of the cradles which engages the belt span between the rolls and tends to urge the flux on the belt span against the workpiece to assure an effective back-up in the welding zone.

An important object is realized by constructing the previously mentioned means of a plurality of pressure elements reciprocatively mounted to the second cradle, and of a resilient means urging the pressure elements against the underside of the belt span between the rolls. Another advantage is afforded by making the pressure elements of rollers that can rock about a transverse axis substantially parallel to the rolls, the rollers adjusting even more precisely to the surface contour in the immediate region of the weld.

An important objective is obtained in constructing each roll with laterally spaced tires adapted to engage and be driven by the workpiece, and in constructing the endless belt disposed over the rolls with side flanges that retain a supply of flux on the belt and engage the workpiece to hold the flux supply on the belt as it is pressed against the work piece under the weld.

Another important object is achieved by the nesting juxtaposition of the frame and two cradles which gives the unique multiple adjusting action desired to obtain the advantageous results.

An important objective of the present invention is to realize a flux feeding and back-up apparatus that is simple and durable in construction, economical to manufacture and assemble, highly efficient in operation, and which can be operated by anyone with little or no instruction.

The foregoing and numerous other objects and advantages of the invention will more clearly appear from the following detailed description of a preferred embodiment, particularly when considered in connection with the accompanying drawings, in which.

Figure 1:
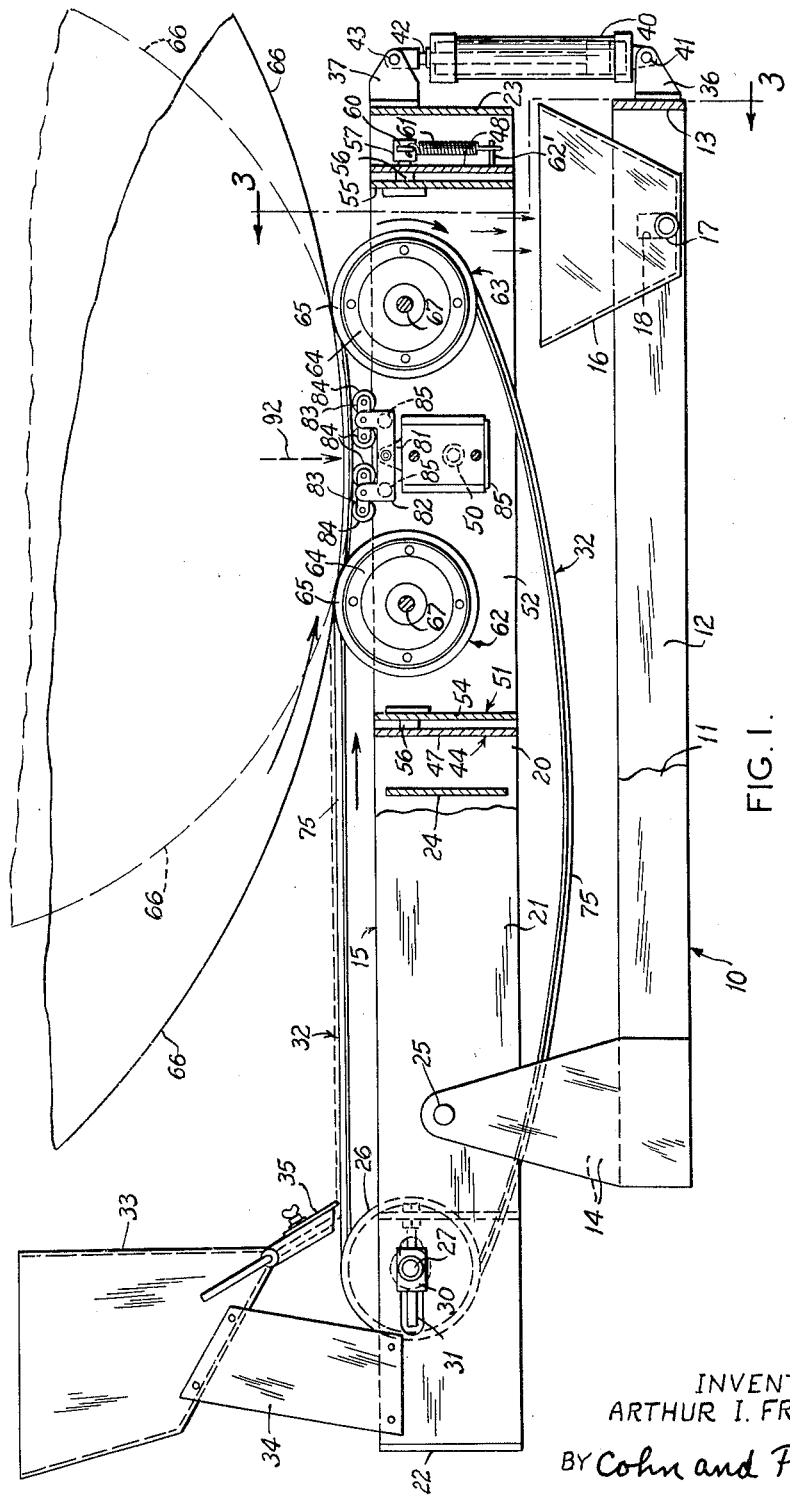
FIG. 1 is a side elevational view, partly cut-away in cross section, of the flux feeding and back-up apparatus.

Referring now by characters of reference to the drawings, and first to FIG. 1, it is seen that the apparatus includes an elongate base generally indicated at 10 having laterally spaced, parallel rails 11 and 12 interconnected at one end by a cross brace 13. The opposite ends of the base rails 11 and 12 are provided with upstanding brackets 14 to which the main frame referred to at 15 is pivoted.

Detachably connected and carried by the front end of base 10 is a flux container 16. Specifically, the container 16 includes a tubular bar 17 that is received in compatable slots 18 formed in the base rails 11 and 12.

Figure 2:
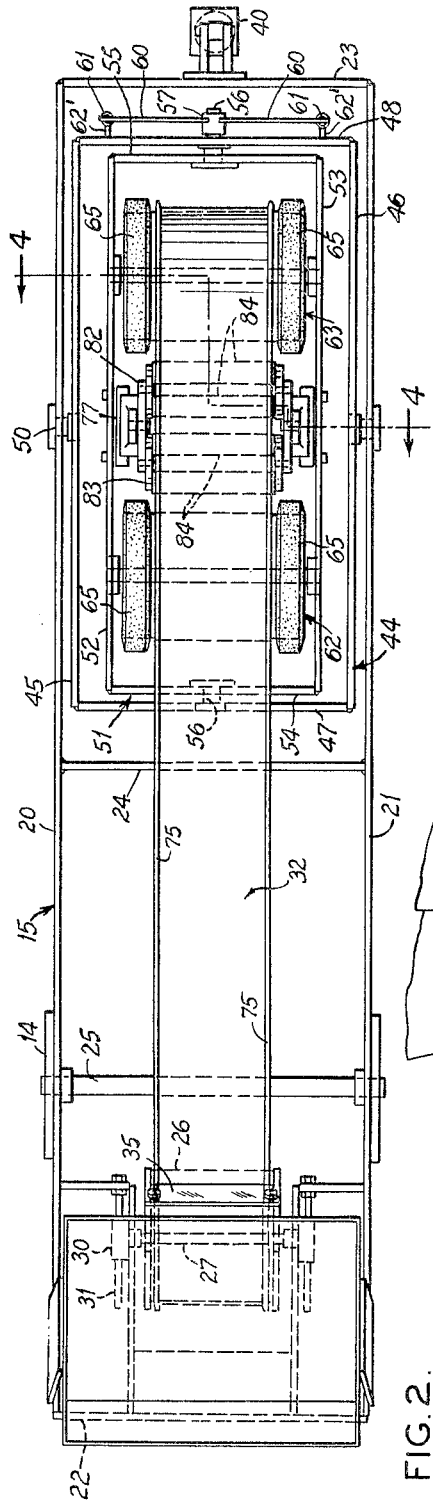
FIG. 2 is a top plan view of the apparatus shown in FIG. 1.

The main frame 15 is generally of an elongate, rectangular shape as is best seen in FIG. 2. The main frame 15 includes a pair of laterally spaced, parallel side members 20 and 21 interconnected by opposed end members 22 and 23. To provide greater strength and rigidity, the side members 20 and 21 are interconnected by an intermediate cross brace 24.

The main frame 15 is located above the base 10 with the side frame numbers 20 and 21 located between the upstanding base brackets 14. A shaft 25 interconnects the side frame members 20 and 21 to the spaced base brackets 14, and hence pivotally connects the main frame 15 to the base 10.

Located between the side frame members 20 and 21 rearwardly of the pivot shaft 25, is a conveyor roll 26. The axle 27 for the conveyor roll 26 is carried at its opposite ends by traveling nuts 30 threadedly connected to rods 31. As will appear upon later description of parts, the position of conveyor roll 26 can be adjusted to regulate the tension of the endless conveyor belt indicated at 32.

Carried by the main frame 15 above the conveyor roll 26 is a tank 33 adapted to hold a supply of flux. The tank 33 is supported by side plates 34 that are attached directly to the frame side members 20 and 21. The tank 33 includes a dispenser 35 that is adapted to deposit a layer of flux of a predetermined quantity and at a predetermined rate on the belt 32 as it travels past the dispenser 35.

Means is provided for raising the main frame 15 about its pivot connection defined by shaft 25, such means operatively interconnecting the base 10 and main frame 15. A bracket 36 is attached to the end brace 13 of the base and a similar bracket 37 is attached to the end member 23 of the main frame 15. A ram interconnects the brackets 36 and 37. More particularly, the cylinder 40 is pivotally connected to the base bracket 36 by pin 41, while the cooperating piston 42 is pivotally connected to the frame bracket 37 by pin 43. As is apparent, the ram consisting of cylinder 40 and piston 42 can be extended by the introduction of fluid in order to raise the main frame 15.

Pivotally mounted within the main frame 15 is a first boxlike cradle 44 having spaced parallel side walls 45 and 46 and spaced opposed end walls 47 and 48. The side walls 45 and 46 are pivotally connected to the side members 20 and 21 of frame 15 by pivot pins 50 defining a transverse pivot axis. A second box-like cradle 51 is located within the first cradle 44, the second cradle 51 including spaced parallel side walls 52 and 53 and spaced opposed end walls 54 and 55. The end walls 54 and 55 of the second cradle 51 are pivotally connected to the end walls 47 and 48 of the first cradle 44 by pivot pins 56 defining a longitudinal pivot axis. It will be noted that the relative pivot axes of the first and second cradles 44 and 51 are located in substantially right angular relation.

The pivot pin 56 at the forwardmost end of the second cradle 51 projects beyond the end wall 48 of the first cradle 44. A collar 57 is fixed to the projecting end of the pin 56 and is rotatable therewith. A pair of arms 60 are attached to the collar 57 and extend laterally outward substantially parallel to, yet spaced from the cradle end wall 48. A pair of tension springs 61 each have one end attached to one arm 60 and have the other end attached to a projection 62' fixed to the cradle end wall 48. It will be apparent that the action of the tension springs 61 is to maintain the cradles 44 and 51 in a balanced nested position.

Figure 4:
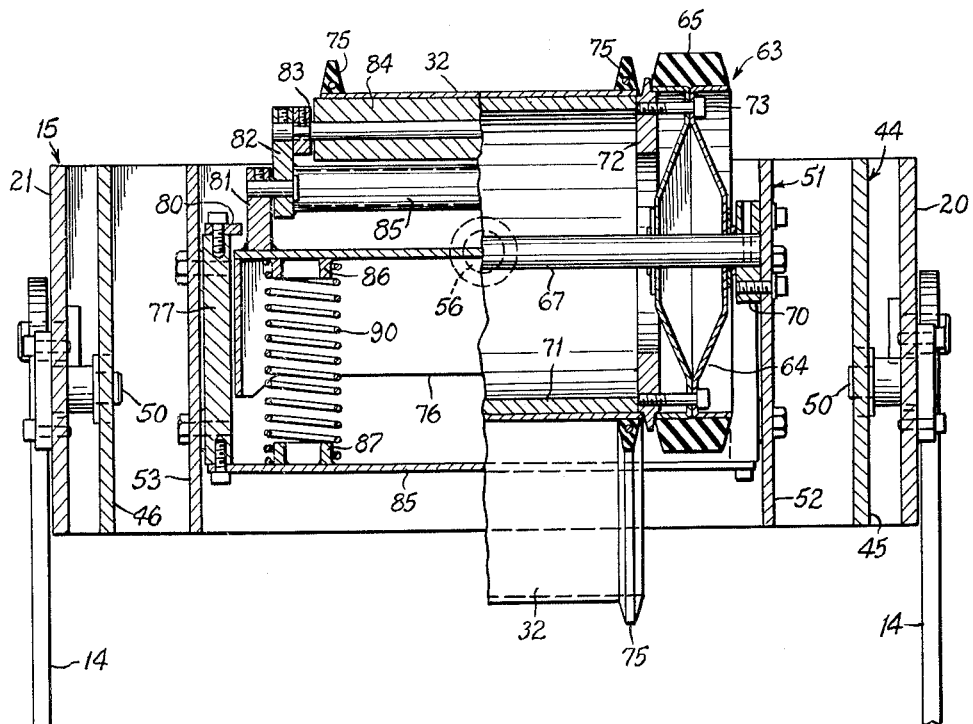
FIG. 4 is an enlarged, cross sectional view as seen along staggered line 4—4 of FIG. 2.

Rotatively mounted within the second cradle 51 are a pair of rolls 62 and 63. It will be noted from FIG. 2, that the rolls 62 and 63 are located in spaced relation and are disposed with their rotative axes in parallel relation to each other and to the pivot axis defined by pin 50 of the first cradle 44, one of the rolls being located on each side of the first cradle pivot axis. The detail of the mounting of the rolls 62 and 63 is best shown in FIG. 4. The rolls 62 and 63 are identical in construction so that a detailed description of roll 63 as illustrated in FIG. 4 will suffice for roll 62.

Figure 3:
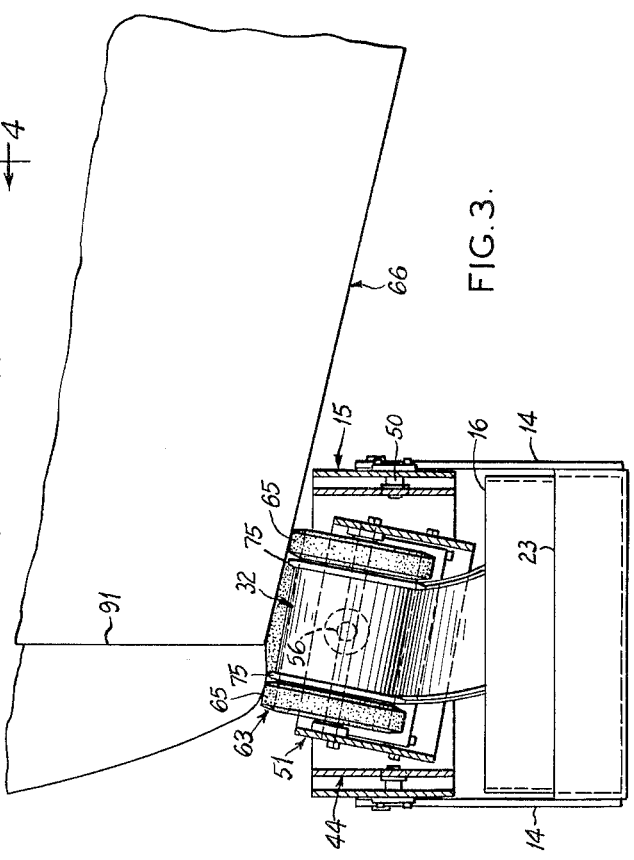
FIG. 3 is a cross-sectional view as seen along staggered line 3—3 of FIG. 1.
Figure 5:
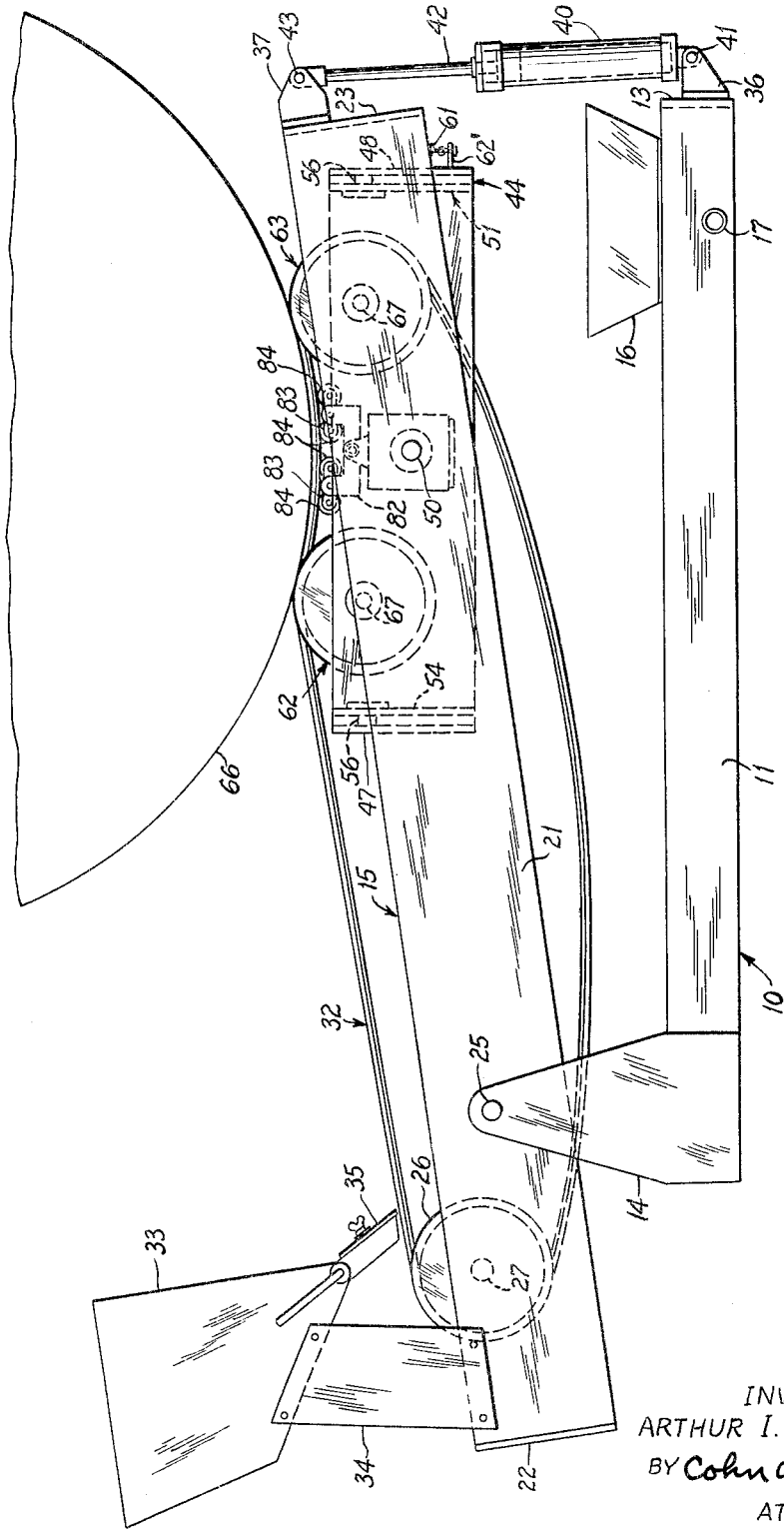
FIG. 5 is a side elevational view of the apparatus similar to FIG. 1 but showing the main frame raised.

The roll 63 includes a pair of tires 65 at each end adapted to engage the workpiece referred to as 66 in FIGS. 1, 3, and 5. The hubs 64 of the tires are fixed to an axle 67 that has its ends journalled in bearings 70 fixed to the side walls 52 and 53 of the second cradle 51. The tires 65 of the roll 63 are interconnected by a cylinder 71 over which the belt 32 is disposed. The cylinder 71 is fixed to the tires 65 by end plates 72 connected to the hubs 64 by bolts 73.

The belt 32 extends substantially the length of the rolls 62 and 63 between the side tires 65. The belt 32 is provided with a resilient flange 75 along each side, the flanges 75 being adapted to hold a supply of flux on the belt and being adapted to engage the work piece 66 so as to cooperate with the belt 32 and the rolls 62 and 63 in pressing the flux against the workpiece.

The belt 32 is of an endless construction disposed over the rear conveyor roll 26 and over the cradle rolls 62 and 63. As described previously, the tension of the belt 32 on these rolls can be adjusted by positioning the rear conveyor roll 26. Upon rotation of the rolls 62 and 63 by engagement with a rotating workpiece 66, the rolls 62 and 63 will pull or move the belt 32 in its endless movement, thereby bringing flux deposited on the belt 32 by the dispenser 35 at a remote point to the welding zone located immediately above the belt span between the rolls 62 and 63.

Pressure means is provided to engage the underside of the belt span between the rolls 62 and 63 and to urge the flux carried by that portion of the belt tightly against the workpiece 66 in the region of the weld immediately below the welding electrode in order to provide a more effective flux back-up. This pressure means includes a transverse crosshead 76 located within the second cradle 51 and between the rolls 62 and 63. The crosshead 76 is slidably mounted for reciprocative movement toward or away from the overlying belt span by a pair of plates 77 constituting guide ways attached to the side walls 52 and 53 of the second cradle 51. Another plate 80 attached to the top of each guide way plate 77 engages the ends of the crossheads 76 to limit the upward movement.

Projecting upwardly from and attached to each end of the crosshead 76 is a post 81. Pivotally mounted to each post is a U-shaped bracket 82 having spaced arms located on opposite sides of the pivot axis of such brackets 82. A bar 83 is pivoted to each bracket arm. A pair of rollers 84 are rotatively mounted to each bar 83 and disposed so that rotative axis of such rollers 84 carried by each bar 83 are located on opposite sides of the pivot axis of such bar 83. Cross rods 85 are attached to the U-shaped brackets 82 at opposite sides of the second carriage 51 so that the U-shaped brackets 82 and the rollers 84 carried by such brackets move in unison about the pivot axis of the U-shaped brackets 82.

Extending between and attached to the bottom of the guide way plates 74 is a bottom plate 85. At each side of the second cradle 51 and immediately adjacent each of the guide way plates 77, the crosshead 76 is provided with a depending cylindrical positioner 86, and the plate 85 is provided with an upstanding cylindrical positioner 87 aligned directly below the positioner 86. Compression springs 90 extend between and operatively interconnect the bottom plate 85 and the crosshead 76, the upper end of each spring 90 being located about the positioner 86 and engaging the crosshead 76 while the lower end of each spring 90 is located about the positioner 87 and engages the bottom plate 85. The springs 90 tend to urge the crosshead 76 and hence the rollers 84 upwardly so that the rollers 84 engage the underside of the belt span between the rolls 62 and 63. It is through that the operation and functional advantages of the flux feeding and back-up apparatus has become fully apparent from the foregoing detailed description of parts, but for completeness of disclosure the usage will be briefly described.

It will be assumed that the apparatus is assembled in the manner described previously and as disclosed in the drawings. The workpiece 66 having a circumferential seam 91 to be welded is placed on the conventional turning rolls (not shown) which rotates the workpiece 66 at a predetermined rate of speed. The seam 91 is welded from the inside of the tank by an electrode assuming the position indicated by the broken arrow 92 in FIG. 1. The weld is made at the bottom of the seam 91.

The present apparatus is disposed transversely to the rotative axis of the tank 66 and disposed under the circumferential seam 91. More particularly, the present apparatus is located with the rolls 62 and 63 on opposite sides of the welding point defined by arrow 92 so that the belt span between such rolls underlies the welding region. Even more definitely, the pivot point for the U-shaped brackets supporting the pressure means that engages the underside of the belt span between the rolls, is located in a vertical plane with the weld point defined by arrow 92.

When the apparatus is appropriately positioned, the main frame 15 is raised about its pivot shaft 25 by actuation of the fluid ram 40 and 42 until the rubber tires 65 of the rolls 62 and 63 engage the workpiece 66 on opposite sides of the vertical plane defined by the circumferential seam 91. The tread of the tires 65 are in frictional engagement with the workpiece 66 so that upon rotation of the work piece 66 the rolls 62 and 63 are driven or rotated. It will be importantly understood that the rolls 62 and 63 do not support the workpiece 66 but merely engage the workpiece under sufficient pressure so that the rolls 62 and 63 are driven upon rotation of the workpiece 66.

A supply of flux is deposited into the flux tank 33. As the rolls 62 and 63 are rotated, the endless belt 32 travels from the remote point underlying the dispenser 35 to the region underlying the welding point, and hence returns in the endless path defined. Flux is deposited on the belt 32 by the dispenser 35 from tank 33, and is carried by a belt 32 to the welding point under the workpiece 66. The flux is retained by the side belt flanges 75 and is urged tightly against the welding seam 91 in the welding region by the belt span between the rolls 62 and 63 to provide an effective back-up. The intervening rollers 84 engage the underside of this span and urge the belt and hence the flux carried by the belt even more tightly against the welding region. As the belt continues in its movement over the roll 63, the excess flux drops off of the belt 32 and falls into the container 16.

Because of the structural arrangement and mounting of the cradles 44 and 51 and the conveyor rolls 62 and 63, this apparatus will feed flux from a remote point to the welding region and will provide an effective flux back-up regardless of the contour of the workpiece 66, whether it be circular, oval, flat, or irregular. Either one or both of the cradles 44 and 51 will pivot to compensate for any change in surface contour in order to maintain frictional contact of the tires 65 of the rolls 62 and 63 with the workpiece, and hence maintain the flux on the belt span between the rolls 62 and 63 tightly against the weld region. The flux will always provide a back-up for the welding electrode.

When the weld is completed, the main frame 15 is lowered by releasing the fluid pressure in the ram 40 and 42. The apparatus can then be repositioned for the welding for another seam.

Although the invention has been described by making detailed reference to a single preferred embodiment, such detail is to be understood in an instructive rather than in any restrictive sense, many variants being possible within the scope of the claims hereunto appended.

I claim as my invention:

1. A flux back-up device comprising:
 (a) a main frame,
 (b) a first cradle pivotally mounted to the frame on an axis,
 (c) a second cradle pivotally mounted to the first cradle on an axis angularly related to the axis of the first cradle,
 (d) rolls rotatively mounted to the second cradle,
 (e) means connected to the frame for raising the rolls against a rotating workpiece, and
 (f) means including a belt disposed over the rolls for continuously delivering flux under a welding zone to provide a flux back-up.

2. A flux back-up device comprising:
 (a) a main frame,
 (b) a first cradle pivotally mounted to the frame,
 (c) a second cradle pivotally mounted to the first cradle on an axis substantially normal to the axis of the first cradle,
 (d) rolls rotatively mounted to the second cradle on an axis substantially parallel to the axis of one of the cradles,
 (e) means connected to the frame for raising the rolls against a rotating workpiece, and
 (f) means including a belt disposed over the rolls for delivering flux under a welding zone to provide a flux back-up.

3. A flux back-up device comprising:
 (a) a base,
 (b) a main frame pivotally mounted to the base,
 (c) a first cradle pivotally mounted to the frame,
 (d) a second cradle pivotally mounted to the first cradle on an axis substantially normal to the axis of the first cradle,
 (e) a pair of spaced rolls rotatively mounted to the second cradle on axes substantially parallel to the axis of the first cradle,
 (f) means for raising the frame to urge the rolls against a rotating workpiece, and
 (g) means including a belt disposed over the rolls for continuously delivering flux under a welding zone between the rolls to provide a flux back-up.

4. A flux back-up device as defined in claim 3, in which:
 (h) means deposits flux on the belt remote from the welding zone between the rolls, and
 (i) the rolls are rotated by the workpiece to pull the belt and to deliver the flux under the welding zone, the rolls and belt tending to hold the flux against the workpiece to provide the flux back-up.

5. A flux back-up comprising:
 (a) a main frame,
 (b) a first cradle pivotally mounted to the frame,
 (c) a second cradle pivotally mounted to the first cradle on an axis substantially normal to the axis of the first cradle,
 (d) a pair of rolls rotatively mounted to the second cradle on axes substantially parallel to the axis of one of the cradles,
 (e) means connected to the frame for raising the rolls against a rotating workpiece,
 (f) means including a belt disposed over the rolls for delivering flux under a welding zone between the rolls, and
 (g) means depositing flux on the belt remot from the welding zone,
 (h) the rolls being rotated by the workpiece to pull the belt and deliver flux under the welding zone, the rolls and belt tending to hold the flux against the workpiece to provide a flux back-up.

6. A flux back-up device comprising:
 (a) a main frame,
 (b) a first cradle pivotally mounted to the frame,
 (c) a second cradle pivotally mounted to the first cradle on an axis angularly related to the axis of the first cradle,
 (d) rolls rotatively mounted to the second cradle,
 (e) means connected to the main frame for raising the rolls against the rotating workpiece,
 (f) means including a belt disposed over the rolls for delivering flux under a welding zone, and
 (g) means carried by one of the cradles engaging the belt span between the rolls, the last said means tending to urge the flux on the belt span against the workpiece to provide a flux back-up.

7. A flux back-up device as defined above in claim 6, in which the last said means engaging the belt span between the rolls comprises:
 (h) a plurality of pressure elements reciprocatively mounted to the second cradle, and
 (i) means resiliently urging the pressure elements against the underside of the belt span between the rolls so as to urge the flux on the belt span against the workpiece.

8. A flux back-up device as defined above in claim 6 in which the last said means engaging the belt span between the rolls comprises:
 (h) a crosshead reciprocatively mounted to the second cradle,
 (i) a pair of laterally spaced brackets pivoted to the crosshead,
 (j) rollers rotatively mounted to the brackets on opposite sides of the axes of the brackets, and
 (k) means resiliently urging the crosshead in a direction to press the rollers against the underside of the belt span between the rolls so as to urge the flux on the belt span against the workpiece to provide the flux back-up.

9. A flux back-up device as defined above in claim 6, in which the last said means engaging the belt span between the rolls comprises:
   (h) a crosshead is reciprocatively mounted to the second cradle,
   (i) a pair of laterally spaced brackets is pivoted to the crosshead,
   (j) a pair of bars is pivoted to each bracket on each side of the bracket axis,
   (k) a pair of rollers is rotatively mounted to each bar on opposite sides of the bar axis,
   (l) and means resiliently urges the crosshead in a direction to press the rollers against the underside of the belt span between the rolls so as to urge the flux on the belt span against the workpiece to provide the flux back-up.

10. A flux back-up device comprising:
   (a) a main frame,
   (b) a first cradle pivotally mounted to the frame on an axis,
   (c) a second cradle pivotally mounted to the first cradle on an axis angularly related to the axis of the first cradle,
   (d) rolls rotatively mounted to the second cradle, each roll including a pair of laterally spaced tires adapted to engage and be driven by the workpiece,
   (e) means connected to the main frame for raising the tires against a rotating workpiece, and
   (f) means including a belt extending over the rolls between the tires, the belt having side flanges for retaining a supply of flux on the belt as it travels under the welding zone to provide a flux back-up.

11. A flux back-up device comprising:
   (a) a base,
   (b) a main frame pivotally mounted to the base,
   (c) a first cradle pivotally mounted to the frame,
   (d) a second cradle pivotally mounted to the first cradle on an axis substantially normal to the axis of the first cradle,
   (e) a pair of rolls rotatively mounted to the second cradle on axes substantially parallel to the axis of the first cradle, each roll including a pair of laterally spaced tires adapted to engage and be driven by the workpiece,
   (f) means for raising the main frame to urge the tires against a rotating workpiece, and
   (g) means including a belt disposed over the rolls between the tires, the belt having side flanges for retaining a supply of flux on the belt as it travels under the welding zone between the rolls to provide a flux back-up.

12. A flux back-up device as defined above in claim 11, in which:
   (h) pressure elements are carried by the second cradle and mounted for rocking action about an axis substantially parallel to the roll axes, and
   (i) means urge the pressure elements against the underside of the belt span against the workpiece.

13. A flux back-up device comprising:
   (a) a main frame having spaced side members,
   (b) a first cradle having opposed side and end walls located within the main frame, the opposed side walls of the first cradle being pivotally mounted to the side members of the frame,
   (c) a second cradle having opposed side and end walls located within the first cradle, the end walls of the second cradle being pivotally mounted to the end walls of the first cradle,
   (d) rolls rotatively mounted to the side walls of and located within the second cradle,
   (e) means including a belt disposed over the rolls for continuously delivering flux under a welding zone, and
   (f) means connected to the main frame for raising the rolls against the rotating workpiece and for holding flux against the workpiece to provide a flux back-up.

14. A flux back-up device as defined in claim 13, in which:
   (g) the rolls are spaced to define a welding zone therebetween, and
   (h) means carried by the second cradle engages the belt span between the rolls and tends to urge the flux on the belt span against the workpiece at the welding zone.

15. A flux back-up device as defined above in claim 13, in which:
   (g) resilient means interconnects the first and second cradles and tends to balance the second cradle within the first cradle.

16. A flux back-up device as defined above in claim 13, in which:
   (g) the rotative axes of the first and second cradles are located substantially at right angles, and
   (h) the rotative axes of the rolls are substantially parallel to the rotative axis of one of the cradles.

17. A flux back-up device as defined above in claim 16, in which:
   (i) a plurality of pressure elements are reciprocatively mounted to the second cradle, and
   (j) means resiliently urge the pressure elements against the underside of the belt span between the rolls so as to urge the flux on the belt span against the workpiece.

18. A flux back-up device as defined above in claim 16, in which:
   (i) each roll includes a pair of laterally spaced tires adapted to engage and be driven by the workpiece, and
   (j) the belt extends over the rolls between the tires, the belt having side flanges retaining a supply of flux on the belt as it travels under the welding zone.

19. A flux back-up device as defined above in claim 16, in which:
   (i) a plurality of pressure elements are reciprocatively mounted to the second cradle,
   (j) means resiliently urge the pressure elements against the underside of the belt span between the rolls so as to urge the flux on the belt span against the workpiece,
   (k) each roll includes a pair of laterally spaced tires adapted to engage and be driven by the workpiece, and
   (l) the belt extends over the rolls between the tires, the belt having side flanges retaining a supply of flux on the belt and engaging the workpiece as it travels under the welding zone to provide a flux back-up.

20. A flux back-up device comprising:
   (a) a base,
   (b) a main frame pivotally connected to the base, the main frame having spaced side members,
   (c) a first cradle having opposed side and end walls located within the main frame, the opposed side walls of the first cradle being pivotally mounted to the side members of the frame,
   (d) a second cradle having opposed side and end walls located within the first cradle, the end walls of the second cradle being pivotally mounted to the end walls of the first cradle, the rotative axes of the first and second cradles being located substantially at right angles,
   (e) a pair of rolls rotatively mounted to the side walls of and located within the second cradle, the roative axes of the rolls being substantially parallel to the axis of the first cradle,
   (f) means connected to the main frame for raising and lowering the rolls against a rotating workpiece,
   (g) means including a belt disposed over the rolls for continuously delivering flux under a welding zone between the rolls, (h) a crosshead reciprocatively mounted to the side walls of the second cradle,
(i) a pair of laterally spaced brackets pivoted to opposite ends of the crosshead,
(j) rollers rotatively mounted to the brackets on opposite sides of the axes of the brackets, the axes of the rollers being substantially parallel to the axes of the rolls,
(k) means resiliently urging the crosshead in a direction to press the rollers against the underside of the belt span between the rolls so as to urge the flux on the belt span against the workpiece,
(l) each roll including a pair of laterally spaced tires adapted to engage and be driven by the workpiece,
(m) the belt extending over the rolls between the tires, the belt having side flanges for retaining a supply of flux on the belt and engaging the workpiece as it travels under the welding zone, and
(n) means depositing flux on the belt at a point remote from the welding zone.

References Cited by the Examiner

UNITED STATES PATENTS 2,294,439   9/1942   Bagley _____ 228—50

WHITMORE A. WILTZ, *Primary Examiner.*